UNITED STATES PATENT OFFICE.

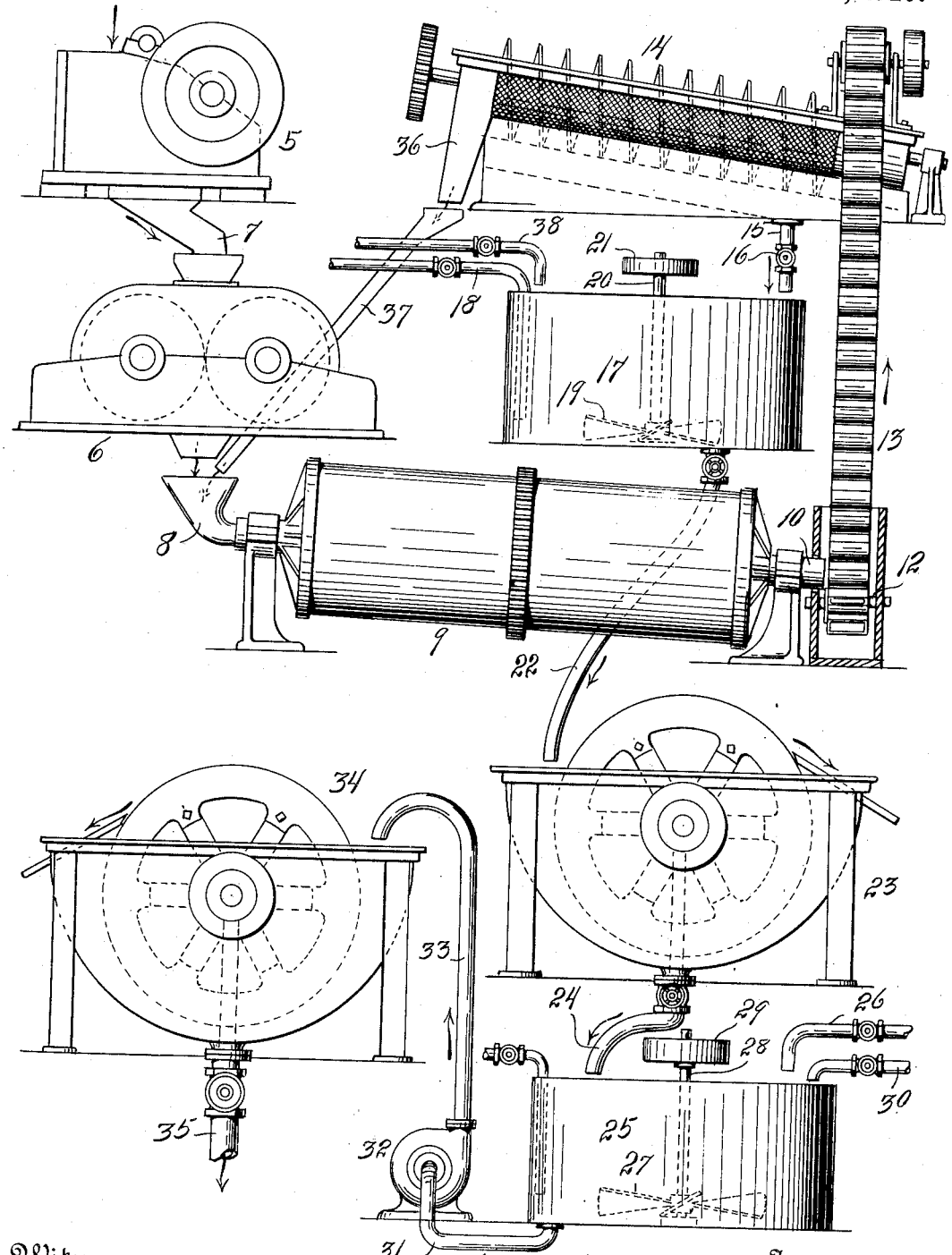

ANTHONY G. DE GOLYER, OF OURAY, AND ALBERT E. LUND, OF DENVER, COLORADO.

PROCESS FOR THE EXTRACTION AND RECOVERY OF TUNGSTEN.

1,335,277.　　　　　Specification of Letters Patent.　　Patented Mar. 30, 1920.

Application filed May 11, 1916. Serial No. 96,820.

*To all whom it may concern:*

Be it known that we, ANTHONY G. DE GOLYER and ALBERT E. LUND, citizens of the United States, residing at Ouray, Ouray county, Colorado, and 924 18th street, in the city and county of Denver and State of Colorado, respectively, have invented certain new and useful Improvements in Processes for the Extraction and Recovery of Tungsten; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to a process for the extraction of the values from tungsten ores. Generally speaking, the complete recovery of these values by our improved process involves two steps, first, the leaching step, and second, the precipitation step. The values in the form of tungstates are first dissolved by leaching after which they are precipitated or separated from the contained solution.

In carrying out our process the ores of tungsten are crushed or pulverized, preferably to pass a 120 mesh screen, or to any other desirable fineness that circumstances or the peculiar qualities of any particular ore may dictate or required. The comminuted ore is then placed in a leaching tank containing a solution of an alkali metal hydroxid or carbonate which dissolves the tungstates. Heat and agitation are used to facilitate the process.

After leaching a suitable length of time, the entire pulp is run through a vacuum filter or other suitable apparatus. The filter cake containing the insoluble gangue and other matter, is thrown away, unless it contains gold, silver, copper or other valuable metals, in which case the filter cake is treated by oil flotation or some other suitable known process.

The solution containing the alkali-metal-tungstate is run to a precipitating tank, and to it is added a salt of calcium, barium, mercury, lead or silver, which precipitates the tungstic acid as a tungstate of the metal whose salt was used as the precipitating agent. Heat and agitation are also used in this tank for the purpose of thoroughly mixing the two solutions and facilitating the process. At this stage the process may be continuous or may be performed in stages. That is, the solution containing the precipitate may be run directly to a vacuum filter, a filter press or other suitable apparatus. Or the solution containing the precipitate may be retained in the precipitating tank or run to a washing tank and the precipitate formed by the precipitating agent agitated in an acid solution termed an "acid wash" to dissolve impurities. This wash leaves the tungsten compound undissolved, and the latter is then separated from the barren solution in a vacuum filter or other suitable apparatus. The barren solution is thrown away, while the filter cake or precipitate is dried for commercial use.

In carrying out the process heretofore outlined, any suitable mechanical construction or constructions may be employed. In the accompanying drawing we have illustrated apparatus in a general or conventional way for carrying out the process, though it must be understood that the invention is not limited to this or any particular apparatus, though that shown will give good results. This drawing is an elevation of the various apparatuses essential to the practice of the process, all of which may be said to constitute a single view, as the different machines are arranged in coöperative relation or so that the material passes successively from one to the other. In the description these machines will be taken up in the order in which they handle the material during the practice of the process.

Let the numeral 5 designate a crusher to which the ore in lump form is fed, and by which the same is broken sufficiently to be treated by a roller mill 6 to which the material is fed from the crusher by way of a chute 7. After passing through the roller mill, the comminuted or pulverized product is discharged into a funnel-shaped mouth 8 from which it passes to a tube mill 9 in which the pulverization of the ore is completed and delivered through an outlet 10 to the boot 12 from which it is taken by an endless conveyer 13 and discharged into a classifier 14 whose screen is of such mesh that the material passing therethrough is of sufficient fineness for treatment by our improved process. The product which passes through the screen of this classifier, is delivered by way of a depending pipe 15 equipped with a valve 16, to a tank 17 which receives the ore in the form of pulp and containing a suitable quantity of water for the purpose. The pulp while in this tank, is supplied by means of a valve-controlled conduit 38 with a suitable solvent for the tungstates. This solvent consists of an alkali metal hydroxid or carbonate. Steam is also introduced by way of a valve-controlled pipe 18, since, by raising the temperature of the contents of the tank, the dissolving or leaching step is facilitated. The contents of the leaching tank 17, are agitated in any suitable manner, as by rotating a paddle wheel 19 which is secured to a shaft 20, the latter being equipped with a pulley wheel 21 which may be connected with any suitable power. The pulp is left in this tank for a period of two hours approximately, during all of which time it is agitated, whereby the solvent is thoroughly mingled therewith and brought into direct contact with the values to be dissolved. After the leaching is complete, the material is drawn from the tank 17 through a valve-controlled outlet conduit 22 and discharged thereby into a vacuum filter 23, which removes the insoluble gangue in the form of a filter cake, which is thrown away if the ore contains only tungsten values. If, however, it contains other valuable metals, this filter cake is saved and treated for the extraction of those metals. The solution is drawn from the filter 23 by way of the valve-controlled outlet 24, and discharged into a precipitating tank 25 where it is supplied with a precipitating agent consisting of a salt of calcium, barium, mercury, lead or silver which serves to precipitate the tungsten as a tungstate of the metal whose salt is used as the precipitating agent as heretofore indicated. The precipitating agent is supplied to the solution in the tank by way of a valve-controlled conduit 26. Steam is also introduced into the tank, whereby the temperature of the solution is raised to a suitable degree, since the warming of the solution facilitates the precipitating step. This step is accomplished approximately instantaneously. The contents of the tank, however, are thoroughly agitated. As shown in the drawing, the paddle wheel 27 is arranged near the bottom of the tank, the same being secured to a shaft 28 equipped with an operating pulley 29 which may be connected with any suitable power for the purpose of rotating the shaft and the agitator 27. After the precipitating agent has done its work, the solution is treated with the acid wash which is introduced by way of a valve-controlled conduit 30. The contents of the precipitating tank, are then carried through the medium of a conduit 31, a centrifugal pump 32 and a conduit 33, to a vacuum filter 34, in which the barren solution is separated from the tungsten compound which is saved in the form of a filter cake, the barren solution being drawn off from the filter through a valve-controlled outlet 35. This filter cake or precipitate is then dried for commercial use.

In carrying out the process, attention is called to the fact that the oversize product or that which will not pass through the screen of the classifier 14, is discharged from the classifier by way of a chute 36 which delivers the oversize material to a conduit 37 which returns it to the funnel-shaped mouth 8 from which it passes to the tube mill 9 for retreatment.

In order that our improved process may be thoroughly understood, the following explanation is given setting forth in detail a specific instance in which the process was carried out or put in practice.

1,000 grams of ore containing tungsten equivalent to 2.92 per cent. tungsten trioxid to the ton, was crushed and pulverized to pass a 120 mesh screen. The tungstate was digested or dissolved in a suitable receptacle containing 250 grams of caustic soda and 3,000 grams of water, the leaching or dissolving step being continued for a period of two hours. Heat and agitation were used to facilitate the dissolving or digesting of the tungstate. The solution carrying the dissolved tungstate was then filtered from the insoluble gangue, and the latter washed with water to remove all soluble salts of tungsten. To the tungsten solution was then added 400 grams of calcium chlorid which precipitated the tungsten from the solution as a calcium tungstate. Heat and agitation were used to hasten the precipitation and render the subsequent filtration more easy, although it was found that neither heat nor agitation were absolutely essential to the proper application of the process. Before being filtered, a sufficient amount of acetic acid was added to give an acid reaction to the solution. This acid dissolved all caustic lime and left the precipitate of calcium tungstate which was filtered from the solution, washed and dried. In this manner 36.1 grams of calcium tungstate were produced. This product contained 28.88 grams of tungsten trioxid, showing a recovery of 99 per cent. of the tungsten trioxid contained in the original 1,000 gram charge.

Having thus described our invention, what we claim is,—

1. The process of extracting tungsten from its ores which consists in digesting the tungsten-bearing mineral with an alkali-metal hydroxid to dissolve the tungsten compounds, filtering, treating the filtrate with a solution of a calcium salt, acidifying with an acid whose calcium salt is readily soluble, and separating the precipitated calcium tungstate.

2. The process of extracting tungsten which consists in digesting tungsten bearing material with an alkali-metal hydroxid to dissolve the tungsten compounds, filtering, treating the filtrate with a solution of a salt of a metal which will form a tungsten compound insoluble in an acid, the said metal salt of which is readily soluble, acidifying with such an acid, and separating the precipitated tungsten compound.

In testimony whereof we affix our signatures.

ANTHONY G. DE GOLYER.
ALBERT E. LUND.